United States Patent

Cardona et al.

(10) Patent No.: US 8,576,861 B2
(45) Date of Patent: Nov. 5, 2013

(54) METHOD AND APPARATUS FOR PROCESSING PACKETS

(75) Inventors: Omar Cardona, Austin, TX (US); James Brian Cunningham, Austin, TX (US); Baltazar De Leon, III, Austin, TX (US); Jeffrey Paul Messing, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1589 days.

(21) Appl. No.: 11/751,302

(22) Filed: May 21, 2007

(65) Prior Publication Data

US 2008/0291933 A1    Nov. 27, 2008

(51) Int. Cl.
*H04L 12/28* (2006.01)

(52) U.S. Cl.
USPC ............. 370/412; 370/419; 710/22; 710/310; 711/216

(58) Field of Classification Search
USPC .................................... 710/22, 310; 711/216
See application file for complete search history.

(56) References Cited

U.S. PATENT DOCUMENTS

| | | |
|---|---|---|
| 2002/0078271 A1 | 6/2002 | Berry |
| 2004/0215907 A1* | 10/2004 | Pizel et al. ............ 711/163 |
| 2005/0228936 A1* | 10/2005 | Kuo et al. ............ 711/1 |
| 2005/0235068 A1 | 10/2005 | Moriki et al. |
| 2006/0064523 A1 | 3/2006 | Moriki et al. |
| 2006/0242333 A1 | 10/2006 | Johnsen et al. |
| 2007/0067432 A1 | 3/2007 | Tarui et al. |
| 2008/0235409 A1* | 9/2008 | Ryzhykh ............ 710/22 |

OTHER PUBLICATIONS

McIntyre et al., "Memory Refresh Schemes for Transmission Control Protocol/Internet Protocol", IBM Technical Disclosure Bulletin, May 1995, vol. 38, No. 5, pp. 41-42.

U.S. Appl. No. 11/693,914, filed Mar. 30, 2007, Cardona, et al.

* cited by examiner

*Primary Examiner* — Nicholas Sloms

(74) *Attorney, Agent, or Firm* — Mitch Harris, Atty at Law, LLC; Andrew M. Harris; Matthew W. Baca

(57) ABSTRACT

A computer implemented method, apparatus, and computer usable program code for processing packets for transmission. A set of interface specific network buffers is identified from a plurality of buffers containing data for a packet received for transmission. A data structure describing the set of interface specific network buffers within the plurality of buffers is created, wherein a section in the data structure for an interface specific network buffer in the set of interface specific network buffers includes information about a piece of data in interface specific network buffer, wherein the data structure is used to process the packet for transmission.

20 Claims, 5 Drawing Sheets

METHOD AND APPARATUS FOR PROCESSING PACKETS

BACKGROUND OF THE INVENTION

1. Field of the Invention

The present invention relates generally to an improved data processing system and in particular to a method and apparatus for processing data. Still more particularly, the present invention relates to a computer implemented method, apparatus, and computer usable program code for processing packets for transmission on a network.

2. Description of the Related Art

Computers and other devices on a network, such as a local area network (LAN) or the Internet, often exchange data with other computers or devices. For example, a word processing application may retrieve a document from storage device located on another computer or save a document onto a storage device on another computer. A browser application may send information, such as a request for a web page. In response to the request, the browser application may receive a web page from a web site located on a server computer. Further, the browser application may send information, such as data entered into a form on a downloaded web page to a server. All of these different types of data transmissions are accomplished by sending data across a network connection using discrete segments of data. The data sent on to a network is referred to as a packet.

Operating systems typically include a network protocol stack that is used to transmit data received by an application for transmission on to a network. This data is typically received in the form of a set of memory locations, such as a set of buffers in the memory of a computer.

Normally, data for packets are stored in system buffers. The data in these types of buffers are either copied by the network device driver to pre-registered transmit buffers or the system buffers are registered dynamically or "on-the-fly" to allow the network adapter to access the data in these buffers. In transmitting data in packets, the network adapter requires access to the memory buffer.

The process of obtaining the memory address accessible by a network adapter and making the underlying memory visible to the network adapter is referred to as "registration". The processor cycles and/or execution time for registration are significant with respect to performance in transmitting packets. If the buffer in which data for a packet is not registered or cannot be registered, then the data is copied to a buffer or memory location that can be accessed by the adapter. This process also takes time and resources.

The networking protocol in the AIX® operating system currently implements interface specific network buffers. AIX® is a registered trademark of International Business Machines Corporation. These types of buffers may be used to improve the performance or speed at which data is transmitted by a networking protocol stack on to the network, due to the fact that these interface specific network buffers are pre-registered with the network adapter.

Performance gains are obtained with these types of buffers because a network device driver does not have to copy a packet for transmission to pre-registered transmit buffers. As a result, the overhead of a copy operation needed to place data received from an application into pre-registered transmit buffers is avoided. In some cases, the network device driver does not have to perform an on-the-fly or dynamic registration of a transmit buffer containing a packet for transmission. This situation results in avoiding a series of system calls that require time in terms of processor cycles and/or completion time.

As a result, interface specific buffers provide a significant performance advantage for transmitting data because the data does not have to be copied or registered dynamically.

In some cases, however, the application may pass a list of network buffers in which this list contains both interface specific buffers and regular or non-interface specific buffers. This list may result in data for a packet for transmission to contain both interface specific buffers and non-interface specific buffers. The processing of data found in mixed types of buffers like these result in the network device driver treating the entire packet as being located in a non-interface specific buffer. As a result, both interface specific buffers and non-interface specific buffers are treated the same in which either a registration of the buffers occurs or the data is copied into pre-registered buffers.

SUMMARY OF THE INVENTION

The illustrative embodiments provide a computer implemented method, apparatus, and computer usable program code for processing packets for transmission. A set of interface specific network buffers is identified from a plurality of buffers containing data for a packet received for transmission. A data structure describing the set of interface specific network buffers within the plurality of buffers is created, wherein a section in the data structure for an interface specific network buffer in the set of interface specific network buffers includes information about a piece of data in interface specific network buffer, wherein the data structure is used to process the packet for transmission.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
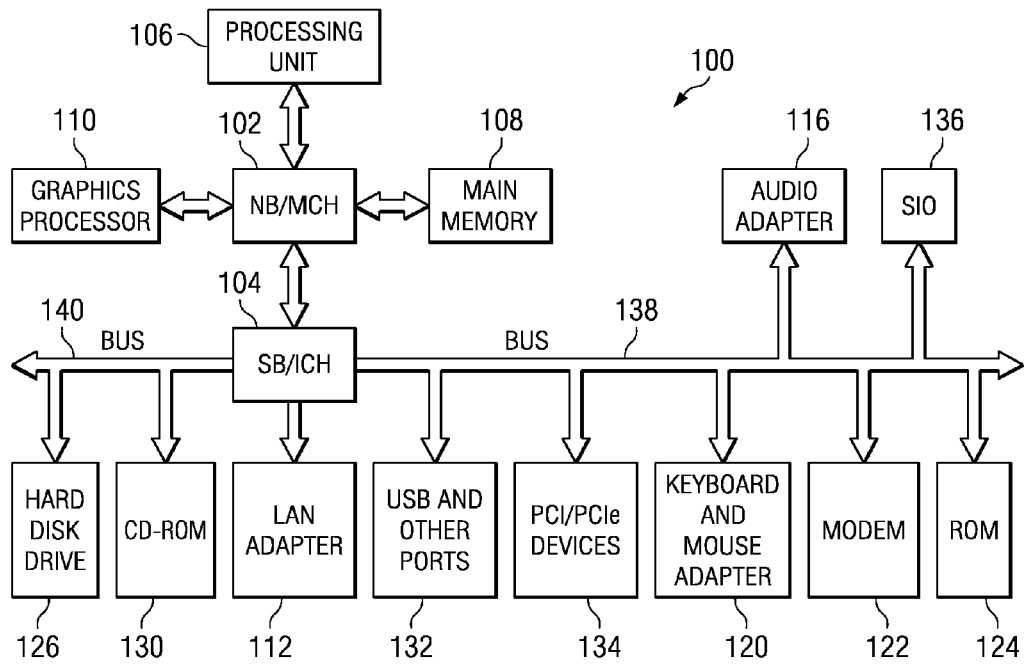
FIG. 1 is a block diagram of a data processing system in which illustrative embodiments may be implemented.

With reference now to the figures and in particular with reference to FIG. 1, a block diagram of a data processing system is depicted in which illustrative embodiments may be implemented. In the depicted example, data processing system 100 employs a hub architecture including a north bridge and memory controller hub (NB/MCH) 102 and a south bridge and input/output (I/O) controller hub (SB/ICH) 104. Processing unit 106, main memory 108, and graphics processor 110 are coupled to north bridge and memory controller hub 102. Processing unit 106 may contain one or more processors and even may be implemented using one or more heterogeneous processor systems. Graphics processor 110 may be coupled to the NB/MCH through an accelerated graphics port (AGP), for example.

In the depicted example, local area network (LAN) adapter 112 is coupled to south bridge and I/O controller hub 104, audio adapter 116, keyboard and mouse adapter 120, modem 122, read only memory (ROM) 124, universal serial bus (USB) and other ports 132, PCI/PCIe devices 134 are coupled to south bridge and I/O controller hub 104 through bus 138. Hard disk drive (HDD) 126 and CD-ROM 130 are coupled to south bridge and I/O controller hub 104 through bus 140.

PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM 130 may use, for example, an integrated drive electronics (IDE) or serial advanced technology attachment (SATA) interface. A super I/O (SIO) device 136 may be coupled to south bridge and I/O controller hub 104.

An operating system runs on processing unit 106. This operating system coordinates and controls various components within data processing system 100 in FIG. 1. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java™ programs or applications executing on data processing system 100. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 126. These instructions and may be loaded into main memory 108 for execution by processing unit 106. The processes of the illustrative embodiments may be performed by processing unit 106 using computer implemented instructions, which may be located in a memory. An example of a memory is main memory 108, read only memory 124, or in one or more peripheral devices.

The hardware shown in FIG. 1 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1. Additionally, the processes of the illustrative embodiments may be applied to a multiprocessor data processing system.

The systems and components shown in FIG. 1 can be varied from the illustrative examples shown. In some illustrative examples, data processing system 100 may be a personal digital assistant (PDA). A personal digital assistant generally is configured with flash memory to provide a non-volatile memory for storing operating system files and/or user-generated data. Additionally, data processing system 100 can be a tablet computer, laptop computer, or telephone device.

Other components shown in FIG. 1 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 108 or a cache such as found in north bridge and memory controller hub 102. Also, a processing unit may include one or more processors or CPUs.

The depicted examples in FIG. 1 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1.

Figure 2:
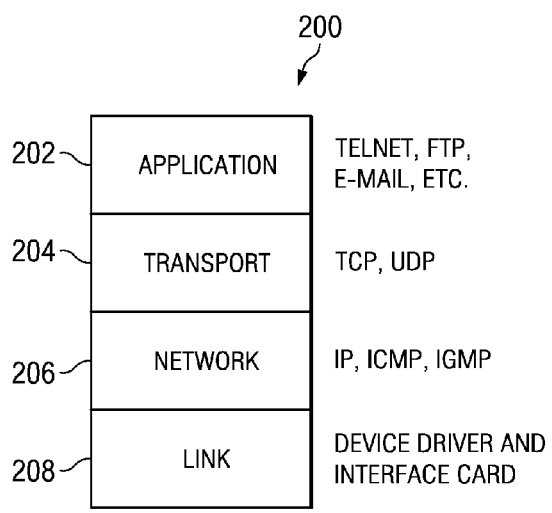
FIG. 2 is a diagram of a transmission control protocol/Internet protocol (TCP/IP) and similar protocols in accordance with an illustrative embodiment.

Next, FIG. 2 is a diagram of a transmission control protocol/Internet protocol (TCP/IP) and similar protocols is depicted in accordance with an illustrative embodiment. TCP/IP and similar protocols are utilized by communications architecture 200. In this example, communications architecture 200 is a 4-layer system. This architecture includes application layer 202, transport layer 204, network layer 206, and link layer 208. Each layer is responsible for handling various communications tasks.

Link layer 208 also is referred to as the data-link layer or the network interface layer and normally includes the device driver in the operating system and the corresponding network interface card in the computer. This layer handles all the hardware details of physically interfacing with the network media being used, such as optical cables or Ethernet cables.

Network layer 206 also is referred to as the internet layer and handles the movement of packets of data around the network. For example, network layer 206 handles the routing of various packets of data that are transferred over the network. Network layer 206 in the TCP/IP suite is comprised of several protocols, including Internet protocol (IP), Internet control message protocol (ICMP), and Internet group management protocol (IGMP).

Next, transport layer 204 provides an interface between network layer 206 and application layer 202 that facilitates the transfer of data between two host computers. Transport layer 204 is concerned with things such as, for example, dividing the data passed to it from the application into appropriately sized chunks for the network layer below, acknowledging received packets, and setting timeouts to make certain the other end acknowledges packets that are sent. In the TCP/IP protocol suite, two distinctly different transport protocols are present, TCP and User datagram protocol (UDP). TCP provides reliability services to ensure that data is properly transmitted between two hosts, including dropout detection and retransmission services.

Conversely, UDP provides a much simpler service to the application layer by merely sending packets of data called datagrams from one host to the other, without providing any mechanism for guaranteeing that the data is properly transferred. When using UDP, the application layer must perform the reliability functionality.

Application layer 202 handles the details of the particular application. Many common TCP/IP applications are present for almost every implementation, including a Telnet for remote login; a file transfer protocol (FTP); a simple mail transfer protocol (SMTP) for electronic mail; and a simple network management protocol (SNMP).

The different illustrative embodiments may be implemented in link layer 208 in these examples. More specifically, different embodiments for processing data for transmission in packets onto a network may be implemented in a network device driver in link layer 208.

The different illustrative embodiments recognize that mixed buffers containing interface specific network buffers and non-interface specific network buffers, may be received for processing. Currently, the processing of these types of buffers is to process the buffers for a packet as all being non-interface specific network buffers. This type of processing reduces the performance gain intended by the use of interface specific network buffers. As a result, processing buffers in this manner wastes resources because interface specific network buffers are being processed in a slower manner than intended.

Thus, the different illustrative embodiments provide a computer implemented method, apparatus, and computer usable program code processing packets for transmission. A set of interface specific network buffers are identified from a plurality of buffers containing data for a packet that is received for transmission. The set of interface network buffers is a set of one or more interface specific network buffers in these examples. A data structure is created in which the data structure describes the set of interface specific network buffers within the plurality of buffers. A section in the data structure for an interface specific network buffer in the set of interface specific network buffers includes information about a piece of data in the interface specific network buffer.

The data structure is used to process the packet for transmission. In this manner, buffers that are identified as interface specific network buffers may be processed as intended, while other buffers may be processed by copying data to a pre-registered transmission buffer or dynamically registering the buffer with the adapter.

Figure 3:
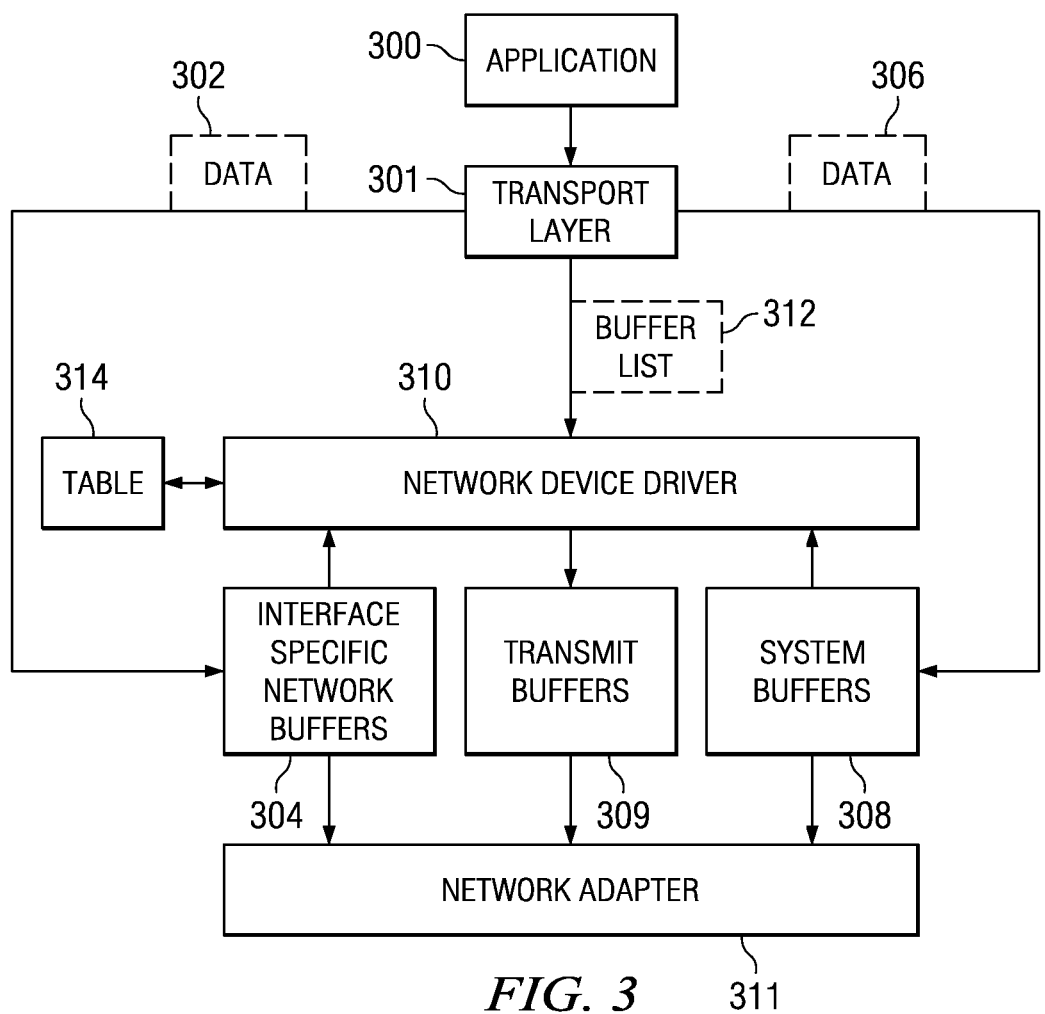
FIG. 3 is a diagram illustrating components used in processing data for packets for transmission in accordance with an illustrative embodiment.

Turning now to FIG. 3, a diagram illustrating components used in processing data for packets for transmission is depicted in accordance with an illustrative embodiment. In this example, application 300 may generate data for transmission onto a network.

In this particular example, application 300 stores may store or write data to a location that in accessed across a network. When application 300 writes the data to transport layer 301, this layer may write data 302 in interface specific network buffers 304. Data 302 may be stored in one or more buffers in interface specific network buffers 304. Transport layer 301 also may write data 306 to system buffers 308. Data 306 may be stored in one or more buffers in system buffers 308.

In these examples, interface specific network buffers and transmit buffers 309 are buffers assigned to network driver 310. Interface specific network buffers 304 may be passed up to application 300 through the stack for use in placing data 302. In these examples, system buffers 308 are buffers that may be accessed by the application, are not mapped to network adapter 311, and do not belong to network device driver 310.

Access to interface specific network buffers is obtained by transport layer 301 making a request to network device driver 310 for these types of buffers. System buffers 308 are accessible to transport layer 301 without requiring a request to be made to network device driver 310. System buffers 308 are buffers do not belong to network device driver 310 and are not visible or accessible by network adapter 311 for transmission onto a network. These types of buffers are used when interface specific network buffers 304 are not provided by network device driver 310.

After transport layer 301 stores data 302 in interface specific network buffers 304 and data 306 in system buffers 308, transport layer 301 informs network device driver 310 that data is present for transmission. Transport layer 301 passes data 302 and data 306 to network device driver 310 for processing by sending buffer list 312 to network device driver 310. Buffer list 312 identifies buffers containing data 302 and data 306. In these examples, buffer list 312 identifies interface specific network buffers 304 and system buffers 308 as buffers containing data 302 and data 306 as being present for transmission as a packet.

In these illustrative examples, network device driver 310 normally would process interface specific network buffers 304 in the same manner as system buffers 308 because buffer list 312 contains both types of buffers. In the illustrative embodiments, however, this type of performance degradation is avoided because network device driver 310 generates a description of the different types of buffers present in buffer list 312 that contain data for a packet that is to be transmitted by network adapter 311.

Network device driver 310 uses buffer list 312 to examine each of the buffers on buffer list 312. The header of the buffer is parsed to identify interface specific network buffers in these examples.

From examining the buffers on buffer list 312, network device driver 310 creates an entry in table 314 for each buffer in buffer list 312 that is identified as an interface specific network buffer. As a result, table 314 contains an identification of all of interface specific network buffers 304 that contain data for a packet. In the depicted examples, network device driver 310 also may create entries for buffers in buffer list 312 that are found in system buffers 308.

Although the depicted examples use a data structure in the form of table 314 to describe buffers identified in buffer list 312, the data structure may take other forms. One example is a linked list.

After table 314 is created, network device driver 310 then processes the data found in buffers identified in buffer list 312 for processing by network adapter 311. If all of the buffers are located in interface specific network buffers 304, network device driver 310 does not need to perform any further processing of the data.

If all of the data is located in system buffers 308, each of the buffers may be copied to transmit buffers 309 to pass the network adapter 311 for transmission onto a network. These buffers are pre-registered buffers that belong to network adapter 311. These are buffers that have not been provided to transport layer 301 in the form of interface specific network buffers. In other words, if network device driver 310 does not provide any of these buffers to transport layer 301, no interface specific network buffers 304 will be present.

Alternatively, system buffers 308 may be registered so that network adapter 311 can access them to send data for the packets in system buffers 308 onto the network. In any event, these are extra processing steps that are performed for data located in system buffers 308.

In this example, data is located both in interface specific network buffers 304 and system buffers 308. With the different illustrative embodiments, data 302 located in interface specific network buffers 304 do not require this additional processing even though data 302 for the same packet also is located in system buffers 308.

Instead, with a mixed list of interface specific network buffers and non-interface specific network buffers in buffer list 312, performance gains still may achieved because the additional processing does not have to be performed for the data found in interface specific network buffers 304. This differentiation of buffers is provided through table 314 in these examples. In this manner, the buffers identified as interface specific network buffers 304 in table 314 do not have to be copied or registered as a transmit buffer by network device driver 310.

Network device driver 310 traverses table 314 and constructs a transmit descriptor list for use by network adapter 310. In processing the buffers, network device driver 310 may copy the data in that buffer into transmit buffers 309 or register that buffer as a transmit buffer for each entry that is not an interface specific network buffer associated or assigned to network device driver 310. Thereafter, the descriptor for that entry is filled out for the data in this buffer.

If on-the-fly or dynamic registration of non-interface specific network buffers for network device driver 310 is excluded, an entry in table 314 may describe a linked list of adjacent buffers. In this case, the data in those buffers may be automatically traversed in the linked list. The number of bytes specified in the length field in this entry beginning at the offset value found for the entry.

For each entry that contains an interface specific network buffer usable or assigned to network device driver 310, network device driver 310 bypasses the copy or dynamic registration of the data for the buffer associated with the entry. Network device driver 310 only needs to fill out the transmit descriptor for that entry. When all of the buffers in table 314 are processed by network device driver 310, network adapter 311 sends the packet onto the network.

Figure 4:
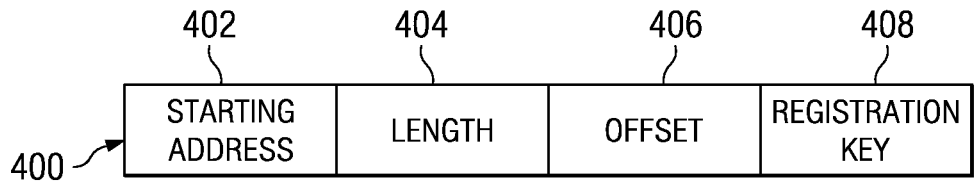
FIG. 4 is a diagram illustrating an entry in a table of buffers in accordance with an illustrative embodiment.

Turning now to FIG. 4, a diagram illustrating an entry in a table of buffers is depicted in accordance with an illustrative embodiment. Entry 400 is an example of an entry in table 314 in FIG. 3.

In this example, entry 400 contains starting address 402, length 404, offset 406, and registration key 408. The information in entry 400 is used to identify a buffer and the information stored by the buffer in these examples. Starting address 402 identifies the starting address of the buffer containing data for transmission in a packet. Length 404 identifies the length of the data stored in the buffer from the starting address.

Offset 406 is a value in bytes that is offset from the beginning of the packet to the beginning of the data for this particular buffer. Registration key 408 indicates whether the buffer is an interface specific network buffer. For example, a null value may indicate that the buffer is not an interface specific network buffer. Length 404 in these examples is a value in bytes.

Figure 5:
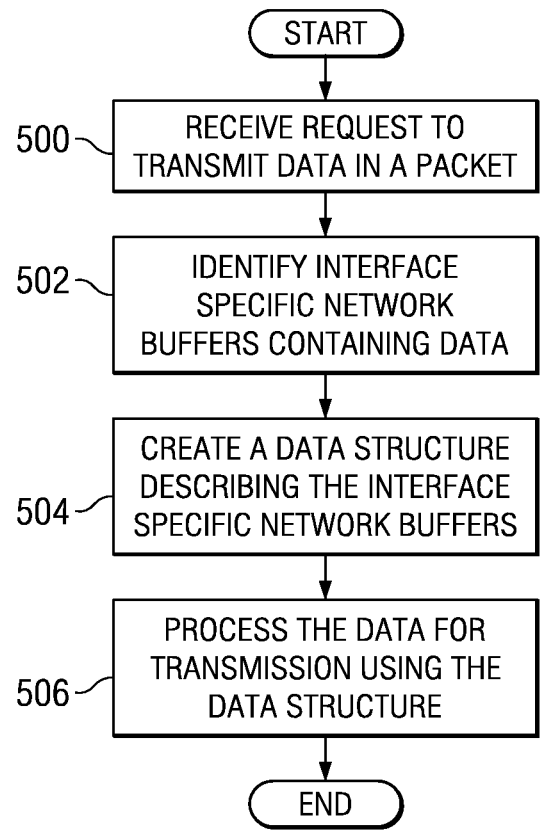
FIG. 5 is a flowchart of a process for processing data for transmission on a network in accordance with an illustrative embodiment.

Turning now to FIG. 5, a flowchart of a process for processing data for transmission on a network is depicted in accordance with an illustrative embodiment. The process illustrated in FIG. 5 may be implemented in a component, such as network device driver 310 in FIG. 3.

The process begins by receiving request to transmit data in a packet (step 500). In step 500 the request may be a buffer list, such as buffer list 312 in FIG. 3. Based on the request, interface specific network buffers assigned to or associated with the network device driver are identified in which data is contained for transmission (step 502). Thereafter, a data structure is created describing the interface specific network buffers (step 504). The data is then processed for transmission using the data structure (step 506) with the process terminating thereafter.

In these examples, the data structure also may include descriptions of buffers that are interface specific network buffers not associated with the network device driver or buffers that are simply not interface specific network buffers.

Figure 6:
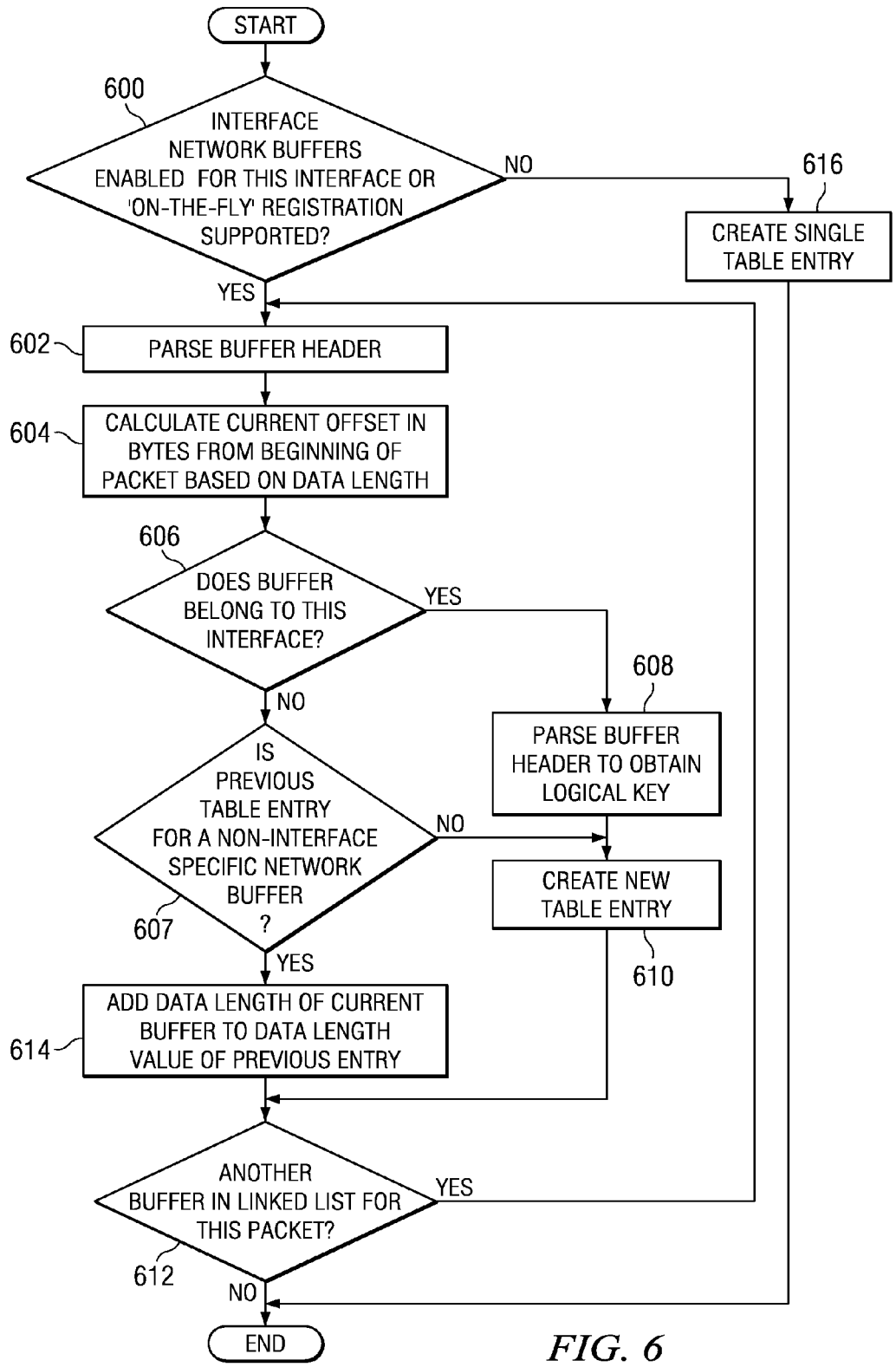
FIG. 6 is a flowchart of a process for processing a packet of data for transmission in accordance with an illustrative embodiment.

Turning now to FIG. 6, a flowchart of a process for processing a packet of data for transmission is depicted in accordance with an illustrative embodiment. The process in FIG. 6 may be implemented in a component, such as network device driver 310 in FIG. 3. The process in FIG. 6 is employed to generate a table, such as table 314 in FIG. 3.

In this example, the process begins by determining whether interface specific network buffers are enabled for this interface or on-the-fly registration is supported (step 600).

If the determination to either of these questions is yes, the buffer header for an unprocessed buffer is parsed (step 602). In these examples, the buffer is parsed to obtain a data address, a data length, and an mpool ID. The mpool ID is the identification of which network device driver the network buffer belongs to in this example. Each network device driver has a pool or group of buffers that are assigned to the network device driver. Thereafter, the current offset in bytes is calculated from the beginning of the packet based on the data length (step 604).

Next, a determination is made as to whether the buffer belongs to this interface (step 606). The interface is the network device driver in these examples. The determination in step 606 is made using the mpool ID in these examples. If the buffer belongs to the interface processing the buffer, the buffer header is parsed to obtain a registration key (step 608). This registration key indicates which registered memory region the buffer belongs to in these examples.

Afterwards, a new table entry is created for the buffer (step 610). In these examples, the table entry includes a table address, data length, offset, and a registration key. The registration key value is null if the buffer is not an interface specific network buffer in these examples.

Then, a determination is made as to whether another buffer is present in the linked list for the packet (step 612). If another buffer is not present, the process terminates. Otherwise, the process returns to step 602 to parse a buffer header for another unprocessed buffer, as described above.

With reference again to step 606, if the buffer does not belong to the interface, a determination is made as to whether the previous table entry in the table is for a non-interface specific network buffer (step 607). If the previous entry is not for a non-interface specific network buffer, the process proceeds to step 610 as described above. Otherwise, the data length of the current buffer is added to the data length value of the previous entry (step 614). The process then proceeds to step 612 as described above.

With reference again to step 600, if interface specific network buffers are not enabled or on-the-fly registration is not supported, the process creates a single table entry (step 616) with the process terminating thereafter. The table entry contains the data address, data length of the packet, an offset value of zero, and a registration key equal to a null value.

Figure 7:
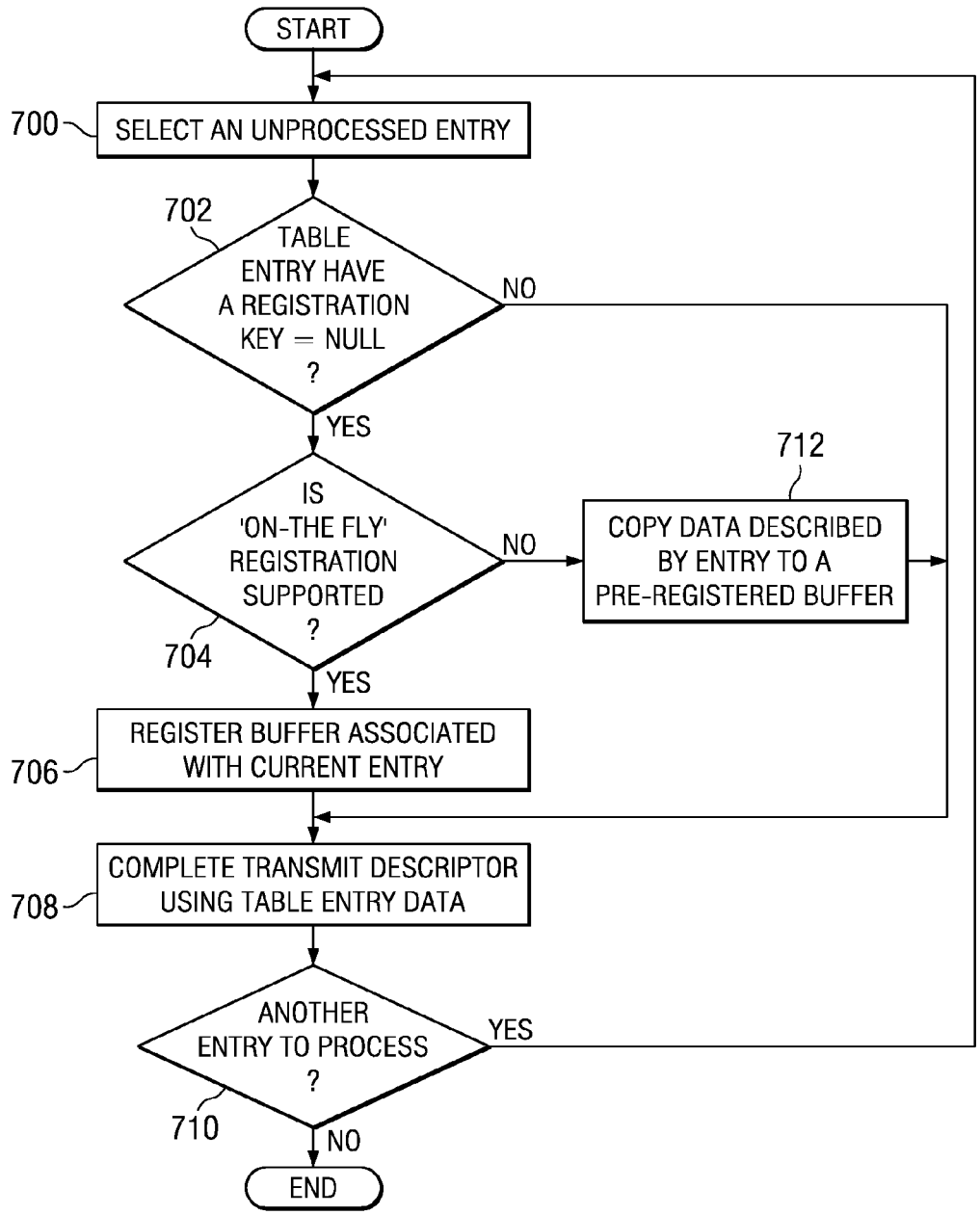
FIG. 7 is a flowchart of a process for processing a table of buffers in accordance with an illustrative embodiment.

Turning now to FIG. 7, a flowchart of a process for processing a table of buffers is depicted in accordance with an illustrative embodiment. The process illustrated in FIG. 7 may be implemented by a software component, such as device driver 310 in FIG. 3.

The process begins by selecting an unprocessed entry from the table (step 700). Thereafter, a determination is made as to whether the table entry value for the registration key is a null value (step 702). If the registration key value for the table entry is a null value, a determination is made as to whether on-the-fly registration is supported (step 704). If on-the-fly registration is supported, the buffer for the current entry is registered (step 706). Next, a transmit descriptor is completed using the table entry data (step 708). A determination is then made as to whether another table entry is present that as not yet been processed (step 710). If another table entry has not been present, the process terminates. Otherwise, the process returns to step 700 as described above.

With reference again to step 704, if on-the-fly registration is not supported, then the process copies the data described by the entry to a pre-registered buffer (step 712). The entry in step 712 may describe one of more buffers.

Thereafter, the process proceeds to step 708 as described above. With reference again to step 702, if the registration key value in the table entry is not a null value, the process proceeds to step 708 as described above.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different illustrative embodiments provide a computer implemented method, apparatus, and computer usable program code processing packets for transmission. A set of interface specific network buffers are identified from a plurality of buffers containing data for a packet received for transmission. A data structure is created describing the set of interface specific network buffers within the plurality of buffers. A section in the data structure for an interface specific network buffer in the set of the interface specific network buffers includes information about a piece of data in the interface specific network buffer. The data structure is used to process the packet for transmission.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of transmitting data from an interface adapter of a computer system, the method comprising:
   collecting a set of data buffers for transmission in a packet by the interface adapter;
   generating a buffer list containing entries describing the collected set of data buffers, wherein the set of data buffers includes interface specific buffers and non-interface specific buffers; and
   parsing the buffer list by a device driver associated with the interface adapter to transmit the data, wherein for each entry of the buffer list, the device driver determines whether or not the corresponding buffer is an interface specific buffer, and responsive to determining that the corresponding buffer is not an interface specific buffer, further processing the data in the corresponding buffer to provide a registered buffer containing the data to the interface adapter, and responsive to determining that the corresponding buffer is an interface specific buffer, the device driver provides the interface specific buffer directly to the interface adapter without further processing the data.

2. The method of claim 1, wherein the further processing the data comprises copying the data from the corresponding buffer to a previously registered buffer associated with the interface adaptor.

3. The method of claim 1, wherein the further processing the data comprises registering the corresponding buffer.

4. The method of claim 1, further comprising responsive to the determining determines that the corresponding buffer is an interface specific buffer, further determining whether or not the corresponding buffer is associated with the interface adapter, and if the corresponding buffer is not associated with the interface adapter, performing the further processing to provide the registered buffer to the interface adapter.

5. The method of claim 1, wherein the generating combines multiple non-interface specific buffers in a single entry.

6. The method of claim 5, wherein the generating generates new entries for interface specific buffers irrespective of whether or not the interface specific buffers are associated with the interface adapter.

7. The method of claim 6, wherein the interface specific buffers contain a header including a pool identifier, whereby the determining determines whether or not an interface specific buffer is associated with the interface adapter by reading the pool identifier.

8. A computer program product comprising a non-transitory computer readable storage medium storing program instructions for execution within a computer system wherein the program instructions comprise a device driver for communicating with an interface adapter, the program instructions comprising program instructions for:
  collecting a set of data buffers for transmission in a packet by the interface adapter;
  generating a buffer list containing entries describing the collected set of data buffers, wherein the set of data buffers includes interface specific buffers and non-interface specific buffers; and
  parsing the buffer list by a device driver associated with the interface adapter to transmit the data, wherein for each entry of the buffer list, the device driver determines whether or not the corresponding buffer is an interface specific buffer, and responsive to determining that the corresponding buffer is not an interface specific buffer, further processing the data in the corresponding buffer to provide a registered buffer containing the data to the interface adapter, and responsive to determining that the corresponding buffer is an interface specific buffer, the device driver provides the interface specific buffer directly to the interface adapter without further processing the data.

9. The computer program product of claim 8, wherein the program instructions for further processing the data comprise program instructions for copying the data from the corresponding buffer to a previously registered buffer associated with the interface adaptor.

10. The computer program product of claim 8, wherein the program instructions for further processing the data comprise program instructions for registering the corresponding buffer.

11. The computer program product of claim 8, further comprising program instructions responsive to the determining that determine whether or not the corresponding buffer is an interface specific buffer, further determine whether or not the corresponding buffer is associated with the interface adapter, and if the corresponding buffer an interface specific buffer not associated with the interface adapter, performing the further processing to provide the registered buffer to the interface adapter.

12. The computer program product of claim 8, wherein the program instructions for generating combine multiple non-interface specific buffers in a single entry.

13. The computer program product of claim 12, wherein the program instructions for generating generate new entries for interface specific buffers irrespective of whether or not the interface specific buffers are associated with the interface adapter.

14. The computer program product of claim 13, wherein the interface specific buffers contain a header including a pool identifier, whereby the program instructions for determining determine whether or not an interface specific buffer is associated with the interface adapter by reading the pool identifier.

15. A computer system comprising a processor for executing program instructions coupled to a memory for storing the program instructions, wherein the program instructions comprise program instructions for communicating with an interface adapter, the program instructions comprising program instructions for:
  collecting a set of data buffers for transmission in a packet by the interface adapter;
  generating a buffer list containing entries describing the collected set of data buffers, wherein the set of data buffers includes interface specific buffers and non-interface specific buffers; and
  parsing the buffer list by a device driver associated with the interface adapter to transmit the data, wherein for each entry of the buffer list, the device driver determines whether or not the corresponding buffer is an interface specific buffer, and responsive to determining that the corresponding buffer is not an interface specific buffer, further processing the data in the corresponding buffer to provide a registered buffer containing the data to the interface adapter, and responsive to determining that the corresponding buffer is an interface specific buffer, the device driver provides the interface specific buffer directly to the interface adapter without further processing the data.

16. The computer system of claim 15, wherein the program instructions for further processing the data comprise program instructions for copying the data from the corresponding buffer to a previously registered buffer associated with the interface adaptor.

17. The computer system of claim 15, wherein the program instructions for further processing the data comprise program instructions for registering the corresponding buffer.

18. The computer system of claim 15, further comprising program instructions responsive to the determining that determine whether or not the corresponding buffer is an interface specific buffer, further determine whether or not the corresponding buffer is associated with the interface adapter, and if the corresponding buffer an interface specific buffer not associated with the interface adapter, performing the further processing to provide the registered buffer to the interface adapter.

19. The computer system of claim 15, wherein the program instructions for generating combine multiple non-interface specific buffers in a single entry.

20. The computer system of claim 19, wherein the program instructions for generating generate new entries for interface specific buffers irrespective of whether or not the interface specific buffers are associated with the interface adapter.

* * * * *